(12) United States Patent
Talukdar et al.

(10) Patent No.: US 9,501,412 B2
(45) Date of Patent: Nov. 22, 2016

(54) EXTERNAL MEMORY TAGGING AND STACK ORDERING OF MEMORY TAGS

(71) Applicant: GainSpan Corporation, San Jose, CA (US)

(72) Inventors: Dipankar Talukdar, San Jose, CA (US); Alan Herring, San Jose, CA (US)

(73) Assignee: GAINSPAN CORPORATION, San Jose, CA (US)

( * ) Notice: Subject to any disclaimer, the term of this patent is extended or adjusted under 35 U.S.C. 154(b) by 47 days.

(21) Appl. No.: 14/623,961

(22) Filed: Feb. 17, 2015

(65) Prior Publication Data

US 2016/0239422 A1 Aug. 18, 2016

(51) Int. Cl.
*G06F 12/08* (2016.01)
(52) U.S. Cl.
CPC ... *G06F 12/0846* (2013.01); *G06F 2212/1024* (2013.01); *G06F 2212/608* (2013.01)

(58) Field of Classification Search
CPC ............... G06F 12/0846; G06F 2212/1024; G06F 2212/608
USPC ........................................................ 711/118
See application file for complete search history.

(56) References Cited

U.S. PATENT DOCUMENTS 7,205,994 B2* 4/2007 Fu .............................. G06T 1/60
345/557

* cited by examiner

*Primary Examiner* — Jasmine Song
(74) *Attorney, Agent, or Firm* — Seyfarth Shaw LLP

(57) ABSTRACT

A cache system includes a processor chip to receive a processing unit address. The cache system also includes a comparator to compare the processing unit address to an address information stored in an allocated tag subset of a tag memory of the processor chip to determine whether the processing unit address matches the address information. The cache system further includes a mapping device to map the portion of the address information to an external memory data, temporarily stored in an allocated data memory subset and a corresponding data memory set of a data memory in the processor. Furthermore, the cache system includes a stacking loop to prioritize the allocated tag subset and a corresponding tag set when the processing unit address matches the address information.

17 Claims, 6 Drawing Sheets

EXTERNAL MEMORY TAGGING AND STACK ORDERING OF MEMORY TAGS

BACKGROUND

1. Field

Aspects of the present disclosure relate to memory tagging, and more particularly to external memory tagging and stack ordering of memory tags.

2. Background

Some processor chips only include an internal memory such as read only memory (ROM) and random access memory (RAM) for code storage. These processor chips typically exclude an embedded flash memory. As a result, any flash code, e.g. ROM patch code and/or new application code, to be processed in the processor chips, may reside in an external flash device, for example, connected to the processor chips through a serial interface. The transfer of flash code to an internal memory of the processor chips is usually managed by a flash cache block. Because the flash device access speed is too low for execute-in-place code for many applications, flash code is transferred to the internal RAM of the processor chips before execution. Conventional implementations for mapping a location of the flash code in the internal RAM and for mapping a location of the flash code in the flash device are inadequate for handling patch codes and new application codes.

SUMMARY

According to one aspect of the present disclosure, a cache system includes a processor chip configured to receive a processing unit address. The cache system also includes a comparing device configured to compare the processing unit address to at least a portion of an address information stored in an allocated tag subset of a tag memory of the processor chip to determine whether the processing unit address matches the portion of the address information. Further, the cache system includes mapping device configured to map the portion of the address information of an external memory data, temporarily stored in an allocated data memory subset and a corresponding data memory set of a data memory of the processor chip. Furthermore, the cache system includes a stacking loop configured to prioritize the allocated tag subset and a corresponding tag set when the processing unit address matches the portion of the address information.

According to one aspect of the present disclosure, a method includes receiving a processing unit address and comparing the processing unit address to at least a portion of an address information stored in an allocated tag subset of a tag memory of a processor chip. The method also includes determining whether the processing unit address matches the portion of the address information based on the comparison. Further, the method includes mapping the portion of the address information of an external memory data, temporarily stored in an allocated data memory subset and a corresponding data memory set of a data memory of the processor chip. Furthermore, the method includes prioritizing the allocated tag subset and a corresponding tag set when the processing unit address matches the portion of the address information.

According to one aspect of the present disclosure, a cache system includes a processor chip configured to receive a processing unit address. The cache system also includes a mask register of the processor chip configured to mask at least a portion of the processing unit address to vary a block size of an allocated portion in an external memory configured to store an external data to be processed in the processor chip as well as to vary a block size of an allocated portion in a data memory of the processor chip configured to temporarily store at least a portion of the external data. Further, the cache system includes a comparing device configured to compare the masked processing unit address to a masked source register address to determine whether the masked processing unit address matches the masked source register address. Furthermore, the cache system includes a remap destination register in the processor chip configured to remap a masked destination register address to the allocated portion, in a data memory, subject to the varied block size when the masked processing unit address matches the masked source register address.

The present disclosure describes methods, apparatuses, and computer program products for external memory tagging and stack ordering of memory tags.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Overview

Aspects of the present disclosure include different types of flash accesses with different mechanism for cache handling of ROM patch codes and new application codes. The ROM patch codes are implemented in smaller blocks of code, which aids in function granularity. The application codes are implemented in large blocks of code and the execution stays within one such application for a relatively long time. Two different aspects or approaches are taken to support both these accesses and they are implemented in two independent sub-blocks. The two approaches include a ROM patch caching implementation and an application code caching implementation.

In an aspect of the present disclosure, the CPU is asked for an address in flash ROM. The code is structured as callable functions which are called using a function pointer table. The CPU uses the function pointer table to determine whether the requested address is in the ROM itself, or in a portion of the SRAM called the flash ROM patch space. The CPU then calls the address in the flash ROM or the flash ROM patch space, as the function pointer table is aware when pointers are pointing to the flash ROM or the flash ROM patch space.

Figure 1:
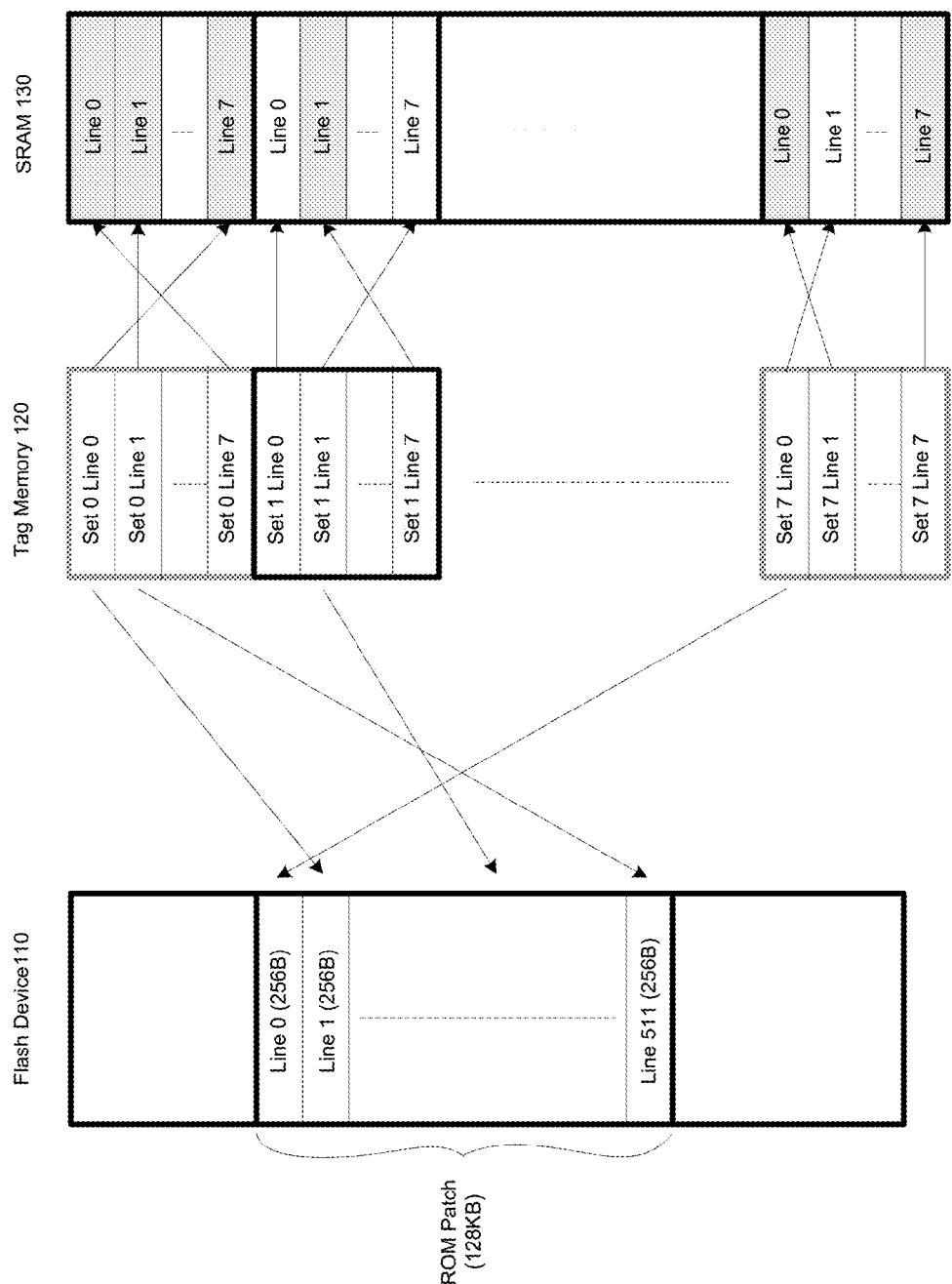
FIG. 1 illustrates an example block diagram of a mapping between cache lines of an internal SRAM of a processor chip and cache lines of an external flash device according to a read only memory (ROM) patch caching implementation of the present disclosure.

FIG. 1 illustrates an example mapping between cache lines of an internal data memory (e.g., SRAM) of a processor chip and cache lines of an external memory (e.g., flash device) according to the ROM patch caching implementation of the present disclosure.

The ROM patch caching implementation utilizes fixed block sizes for storing the ROM patch code as well as addresses associated with the ROM patch code. In one aspect of the disclosure, a flash device space, e.g., 128 kilobytes (KB) may be allocated in the flash device for a ROM patch code. The flash device space may be divided into 512 cache lines (i.e., line 0 to line 511). Each flash cache line may be 256 bytes long. An offset of a line in the flash device space may be defined as a flash index. In addition, a determined SRAM device space, e.g., 16 KB, may be allocated in the SRAM 130 for storing a ROM patch code. The 16 KB space is contiguous and aligned on a 16 KB boundary of the SRAM 130. The 16 KB space in the SRAM includes 64 cache lines, in which each cache line is 256 bytes. An offset of a cache line in the SRAM 130 is defined as SRAM offset. Data transfer from the flash device 110 to the processor chip may be implemented through the cache lines. The cache lines in the SRAM 130 may or may not include instructions or data. A cache line in the SRAM 130 as well as a cache line in the flash device 110 can be mapped to other cache lines of other devices (e.g., tag memory 120) in the processor chip. In one aspect of the disclosure, the mapping of the cache lines of the flash device 110 as well as the cache lines of the SRAM 130 may be implemented by hardware.

The 64 cache lines in the SRAM 130 are logically divided into 8 sets, with each set including 8 cache lines each. The sets are numbered 0 to 7 in order of increasing address. The cache lines within a set are numbered 0 to 7 in order of increasing address. At any time during the ROM patch caching implementation, only one set is active while the other seven sets are considered dormant. Similar to the SRAM 130, the tag memory/storage 120 of the processor chip includes 64 cache lines divided into 8 sets of 8 cache lines. Although the 64 cache lines are divided into 8 sets of 8 cache lines in this example, other divisions of the cache lines are possible.

An index of the cache lines in the SRAM 130 are maintained by hardware in the tag memory 120. A tag entry in the tag memory 120 may include address information for external data (e.g., ROM patch code), originating from the flash device 110. The external data may be temporarily stored in an allocated portion of the SRAM 130 for ROM patching. Each tag entry includes a number of bits of tag, e.g. 9-bit tag, a valid bit, a lock bit and a number of bits of SRAM line index, e.g., 6-bit SRAM line index. In one aspect of the disclosure, hardware updates the tag entries as new cache lines associated with new or updated external data fetched from an external memory, such as a flash device cache. Every time a new set in the tag memory 120 is selected as active, the corresponding tag entries (i.e., eight tag entries) of the new active set are selected through a multiplexer (not shown) as the inputs to a compare device (e.g., comparator). In one aspect, a tag entry in the tag set can be accessed according to a software implementation. For example, the software implementation may implement a read/write access to the tag entry. At a core reset all the valid/lock bits of the tag entry are reset to zero and the SRAM line index is set to zero through 63. In one aspect of the disclosure, a base address of a ROM patch area or portion of the flash device 110 may be maintained in hardware. If the base address is unavailable, the operation of the block associated with the base address is bypassed.

Cache lines of the tag set (e.g., tag set 0-7) can be set to point or map to cache lines corresponding to a location or address of the flash device 110 where the external data is stored. In one aspect of the disclosure, cache lines of the tag memory may be mapped to cache line of the flash device 110 according to a dynamic mapping configuration. Accordingly, it is typically desired, but unnecessary for the cache lines of the tag memory 120 to have a one to one relationship with the cache lines of the flash device 110. For example, cache line 0 of the first tag set may be configured to point to cache line 1 of the ROM patch code address space/location, cache line 1 of the first tag set may be configured to point to cache line 511 of the ROM patch code address space, cache line 1 of the second tag set may be configured to point to any cache line between 1 and 511 of the ROM patch code address space and cache line 0 of the last tag set may be configured to point to cache line 0 of the ROM patch code address space.

However, the cache lines of the tag set (e.g., tag set 0-7) in the tag memory 120 may be configured to map to corresponding cache lines in the SRAM 130 according to a one-to-one configuration. For example, cache line 0 of the first tag set (i.e., set 0) may be configured to point to cache line 0 of the first SRAM set (i.e., set 0). Similarly, cache line 7 of the last tag set (i.e., set 7) may be configured to point to cache line 7 of the last SRAM set (i.e., set 7). Although 8 tag sets are described in this example, different number of tag sets are possible.

Operation

Figure 2:
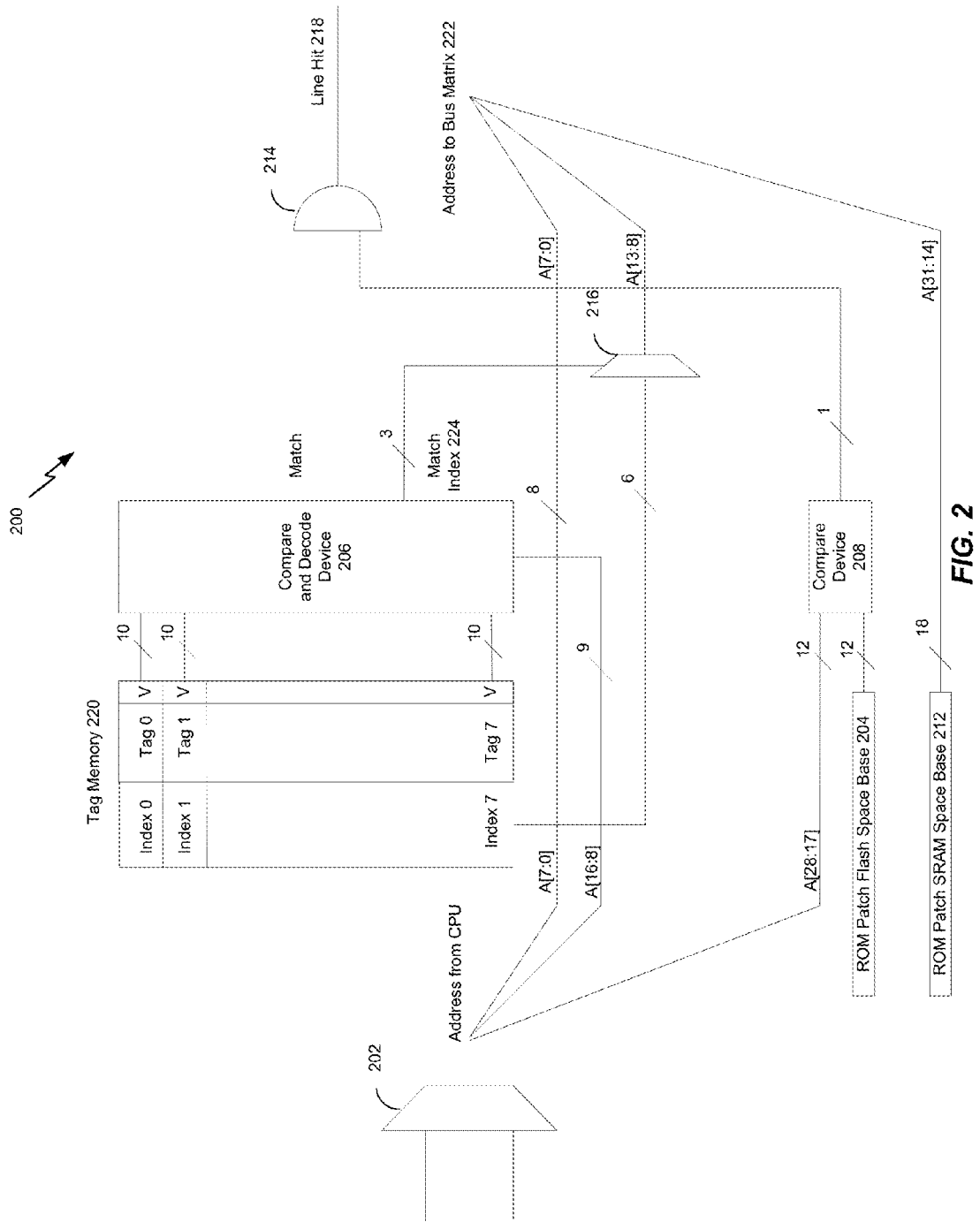
FIG. 2 illustrates an example block diagram of a ROM patch caching implementation in accordance with one or more aspects of the present disclosure.

FIG. 2 illustrates an example block diagram of a ROM patch caching implementation 200 in accordance with one or more aspects of the present disclosure.

A CPU (e.g., Application CPU or wireless local area network CPU of the processor chip) access address or processing unit address may be 32-bit CPU access address divided into logical sections including a byte index, a word index, a line index and a flash address space base address. The first eight bits of the CPU access address (e.g., bit 0 to bit 7 represented by A[7:0]) may include a byte index within a word and a word index within a line. The byte index within a word may be the two least significant bits (LSB) of the CPU access address. The next higher six bits are the word index within a line. The next 9 bits (e.g., bit 8 to bit 16 represented by A[16:8]) are the line index, which correspond to the tag entry. Address information corresponding to the external data temporarily stored in the SRAM 130, are stored in the tag memory 220. At least some of the rest of the most significant bits (MSB) represent the ROM patch space base address (e.g., bit 17 to bit 28 represented by A[28:17]).

In one aspect of the disclosure, an operation of the ROM patch caching implementation is enabled when a portion of the CPU access address (e.g., ROM patch space base address) corresponds to an address space of the ROM patch code stored in the tag memory 120. For example, on every access cycle from the CPU, the ROM patch space base address A[28:17] is checked to determine whether there is access to a ROM patch flash location. Whether the ROM patch space is accessible is based on a comparison of the ROM patch space base address A[28:17] and the ROM patch space base. The comparison can be implemented by a compare device 206. In one aspect the compare device 206 may be implemented in conjunction with a decode device and represented as a compare and decode device 206. The ROM patch space of flash location in the SRAM 130 may be deemed accessible when the ROM patch space base address A[28:17] matches the ROM patch space base address in patch cache logic of a flashcache block. Otherwise, the ROM patch space is deemed inaccessible and the corresponding block is bypassed. If the ROM patch space base address A[28:17] corresponds to the ROM patch space base address, a FlashCache of the processor chip is deemed active and the following situations can occur.

Line Hit in First Tag Set

The line index bits A[16:8] of the CPU access address, which correspond to the tag entry indicating an address information in the SRAM 130 for storing the ROM patch code, are compared in parallel to the eight tag entries of the first set. The comparison of the tag entries to the line index bits A[16:8] may be implemented by the compare and decode device 206. If there is a match of the line index bits A[16:8] with a valid tag entry (e.g., in the first tag set 0), this is considered a hit. The hit indicates that accessed data corresponding to the ROM patch code is available in the SRAM 130. The hit is indicated by a line hit indicator 218 at an output of a logic gate, e.g., AND gate 214. The inputs to the AND gate 214 includes an output from the compare and decode device 206 indicating whether the line index bits A[16:8] matches the valid tag entry as well as the output from a compare device 208 indicating whether the ROM patch space is accessible. As a result of the hit, an SRAM address is created by concatenating a ROM patch SRAM space base address (e.g., represented by the address bits A[31:14]), a 6 bit matching tag entry SRAM index (e.g., represented by the address bits A[13:8]) in conjunction with the word index and/or the byte index (e.g., represented by the address bits A[7:0]). The new SRAM address is passed on to a bus matrix 222 that is coupled to the SRAM 130. The matching tag entry SRAM index is based on an index of the matching tag entry.

In one aspect of the disclosure, the matching tag entry SRAM index or a version of the matching tag entry SRAM index is outputted by the tag memory 220 and received at an input of a logic device 216. The logic device 216 then outputs a parameter representing the matching tag entry SRAM index from a first output coupled to the bus matrix 222. The logic device 216 also outputs a 3 bit match index 224 that corresponds to the matching tag entry from a second output coupled to the compare and decode device 206. The matching tag entry is prioritized (e.g., moved to the top of the tag set in the tag memory 220) to create an implicit most recently used (MRU) stack. Moving the matching tag entry to the top of the tag set is based on a logic loop including the compare and decode device 206, the logic device 216, and the tag memory 220. Upon detection of the matching tag entry, the 3 bit match index 224 based on the matching tag entry is fed back into the compare and decode device 206 to facilitate prioritization of the matching tag entry.

In another aspect of the disclosure, if there is a hit in the second set of eight lines, corresponding to the tag entry indicating an address information in the SRAM 130 for storing the ROM patch code, the second set of eight lines are moved to the top of the line index. Further, the line that matched the request is moved to the top of the set. The movement of the second set of eight lines and the matching line may assist future searches in returning a hit faster, since lines that have been previously matched or hit are moved to the top of the cache and searched first.

Line Miss in First Tag Set

If the accessed line index representing the tag entry is not in the first tag set (e.g., tag set 0) of the tag memory 220, the dormant tag sets (sets 1-7) are searched based on an hardware implementation, for example, to determine whether the accessed line index is matched indicating that the patch code exists in the SRAM 130. The search is a multi-cycle operation and the CPU is stalled during this process. On each clock cycle, all the 8 tag entries of a dormant tag set (which becomes active when selected) are selected for comparison. If the access line index corresponding to an address of a location in the SRAM storing the external data is available in any of the dormant tag sets, the line is eventually matched within the next 7 cycles and the stall to the CPU is removed. The tag sets (sets 1-7) after the first tag set (set 0) may be searched in a fixed order, e.g., from tag set 1 to 7. If a match is found in any of the 7 tag sets (i.e., 1-7), the search process terminates. The matching tag entry is moved to the top of the tag set as discussed. The tag entries are moved as the search progresses such that the top entry is available on an eventual match.

Line Miss

If there is no match in any of the tag sets, which indicates that the ROM patch code is unavailable in the SRAM, a new line fetch from the flash device 110 is initiated. In one aspect of the disclosure, the bottom most tag entry location of the complete tag set is selected for a replacement or new tag entry. A start address of a block in the flash device 110 is created by concatenating the ROM patch flash address base, the line index and a zero padded feature to align the address to a line boundary. The start address of the cache line destination in SRAM 130 is calculated by concatenating the SRAM space base address, a replacement tag set index, the replacement line index and the zero padded feature to align to the line boundary. These two addresses (block address and line address) and a transfer length of 256 bytes are forwarded to a flash interface direct memory access (DMA) of the processor chip. The flash interface DMA initiates a transfer through a flash interface block and DMA (flash-DMA), and the data or address is written directly into the SRAM through a system bus matrix of the processor chip. When a transfer complete indication is received from the DMA engine, a valid bit in a replacement set/line is set and entered at the top of the tag set. The comparison logic then indicates a hit and the stall to the CPU is removed.

If there is a miss, a replacement process occurs where individual lines are shifted into the top of the cache (e.g., the flash DMA) and out of the bottom. This allows for the most recently used cache line to be accessible in the memory.

Software Initiated Preload and Line Locking

In one aspect of the disclosure, loading of a cache line may be initiated by an algorithm or software implementation using the flash interface DMA of the processor chip. After the loading of the cache line, a corresponding tag entry of a tag set may be updated by software, for example, with the flash line index and the valid bit. To support locking of lines, each cache line in each tag set is associated with an accessible lock bit. If the bit for a particular cache line is set, the replacement selection (e.g., hardware replacement selection) does not select the particular cache line for replacement and checks for the next cache line. The process can continue until a non-locked line is detected. If all of the cache lines in all the sets are locked, the bottommost tag entry of the tag set is selected for replacement. In one aspect, an initiated preload may be implemented in the absence of a ROM fetch that may require patching. This feature may avoid unexpected interaction between hardware generated flash load and software initiated flash load.

MRU Replacement Policy

The replacement policy uses an implicit MRU stack. Each of the 64 cache lines corresponding to the tag entry in the eight sets of the tag memory is considered as a single entity, although comparisons are done only with eight tag entries in one cycle. Whenever a tag entry match is found, either in one of the eight tag entries of the first tag set or any other tag entry of a subsequent tag set, the set corresponding to the matching entry as well as the matching entry are prioritized or entered at the top of the stack. Consequently, the other tag entries and their corresponding tag sets are moved down the stack in the tag memory. The bottommost tag entry is the least recently used tag entry. As a result, the bottommost unlocked tag entry is selected for replacement.

Application Code Caching

Block Architecture

Figure 3:
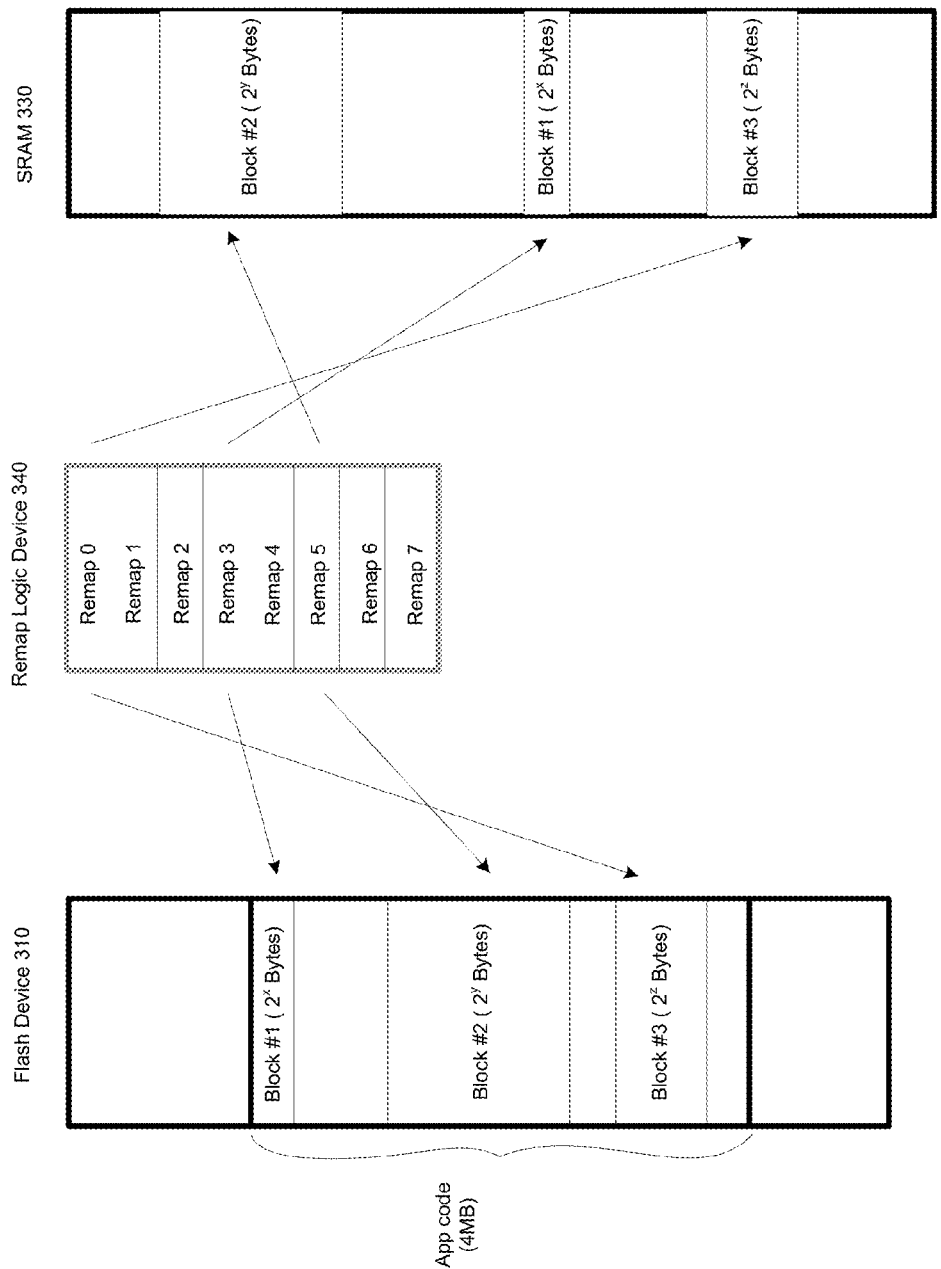
FIG. 3 illustrates an example block diagram of a mapping between cache lines of an internal SRAM of a processor chip and cache lines of an external flash device according to an application code caching implementation of the present disclosure.

FIG. 3 illustrates an example mapping between cache lines of an internal SRAM 330 of a processor chip and cache lines of an external flash device 310 according to an application code caching logic of the present disclosure.

The application code caching implementation utilizes flexible or variable block sizes for storing the application code as well as the addresses associated with the application code. A mask based address translation logic allows the block size corresponding to the application code as well as the addresses associated with the application code to be variable. For example, the block size allocated for the application code in the SRAM 330 as well the flash device 310 are variable. The mask based address translation logic varies the block sizes according to block translation ranges. The application code caching implementation avoids placing implicit restriction on the SRAM space or location for storing the application code from the flash device 310. However, in one aspect of the disclosure, the block sizes may be specified as power of two blocks and located on corresponding power of two boundary.

A remap logic may be implemented on a remap logic device 340 in the processor chip to support remapping of up to 8 blocks in memory that correspond to remap 0-remap 7 in the remap logic device 340. The remap logic device 340 may be implemented in hardware. In one aspect of the disclosure, the remap logic device may be a hardware device. The remap logic device 340 can be set to point or remap any location in the SRAM address space according to a dynamic mapping configuration instead of a one-to-one mapping configuration. For example, remap 0 may be configured to point to block #3, remap 3 to block #1 and remap 5 to block #4 of the SRAM. Similarly, the remap logic device 340 may be configured to point to any location in the blocks of the flash device 310 storing the application code according to the dynamic mapping configuration. For example, remap 0 may be configured to point to block #3, remap 3 to block #1 and remap 5 to block #2 of the flash device 310. If a requested flash address falls within the block translation ranges, the remap will take place without any CPU stall. If there is no match with any of the eight blocks, the address is ignored by this function.

The address space to be mapped (by a software implementation, for example) are accessed after a compare device (e.g., comparators) for comparing address bits is initialized. There is no recovery mechanism. In some aspects of the disclosure, the management of loading code from the flash device 310 and deciding the size and location of the flash data or application code to be mapped through a particular block may be implemented by software or an algorithm. Management of the allocation of the SRAM space may also be implemented by software. Further, a software handling process may be implemented when the flash mapping is not in hardware registers, for example. The software handling process may be configured to allocate SRAM space, initiate transfer of the flash data through a flash DMA, and update a translation register to enable the new mapping after the transfer of the flash data through the flash DMA.

Operation

Figure 4:
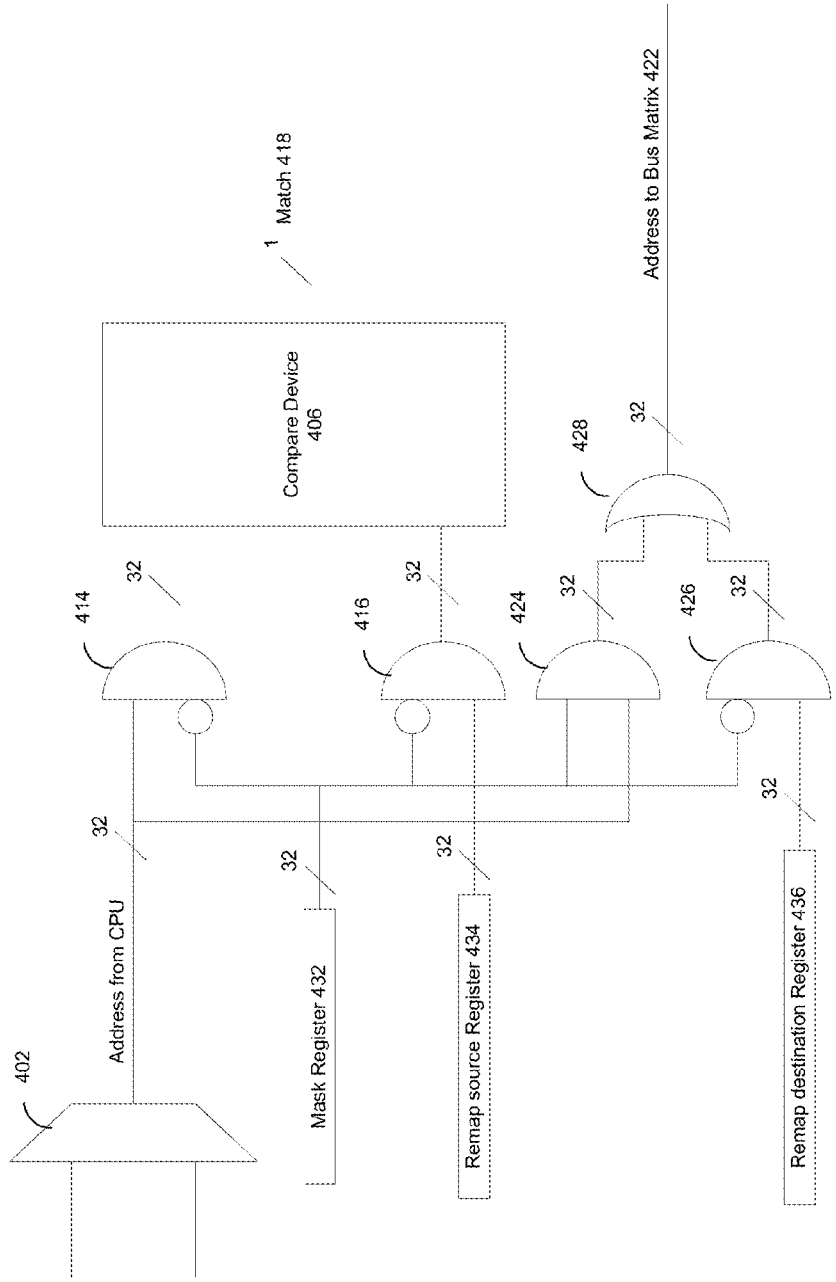
FIG. 4 illustrates a block diagram of the application code caching implementation for remapping in accordance with one or more aspects of the present disclosure.

FIG. 4 illustrates a block diagram of the application code caching implementation for remapping in accordance with one or more aspects of the present disclosure.

The operation of the application code caching implementation is enabled when a block comparison is enabled and the CPU access address corresponds to an application code address space represented by a 32-bit remap source register address. The 32 bit address of the CPU is compared to the 32-bit remap source register address by an compare device 406 to determine whether the addresses from the CPU matches the remap source register address stored in a remap register (not shown). The remap register may be defined as part of a remap logic device 340 (e.g., flashcache) in the processor chip. A remap source register 434 of the remap logic device 340 generates the 32 bit remap source register address. In some aspects, a 32-bit mask from a mask register 432 is applied to the CPU access address as well as the remap source register address via a first logic device (e.g., AND gate 414) and a second logic device (e.g., AND gate 416), respectively, to ignore some bits of the 32 bit address of the CPU as well as some bits of the 32-bit remap source register address prior to the comparison at the compare device 406. In one aspect, a bit of the 32 bits of both addresses (remap and CPU) may be ignored when a mask bit of the 32 bit mask register is high. In some aspects, the mask register 432 may be configured to mask the LSBs of the 32 bits of both addresses (remap and CPU) to provide a variable sized block address comparison at the compare device 406. The formatting of the masked bits may be based on a software implementation. For example, if the remapping is for a 16 Kbyte block, then the mask register may contain bits corresponding to specified configuration such as 0x00003FFF. In this example, the addresses are masked such that only the upper 18 bits of the addresses are effectively used for the comparison.

If match is found between the 32 bit address of the CPU and the 32-bit remap source register address, remapping using a remap destination register 436 of the remap logic device 340 is implemented to remap to the SRAM address space corresponding to the location of the application code. The match may be indicated by a one bit match indicator 418 at an output of the compare device 406. The bits of the CPU access address corresponding to the mask high bits (e.g., LSB bits) are masked or forced to 0 at the logic device 424 and logically combined at a logic gate (e.g., OR gate 428) with the MSBs of the remap destination address. The result is the byte address in the SRAM space. The SRAM address is passed on to a bus matrix 422 that is coupled to the SRAM 330.

The remap comparison may be implemented with eight parallel comparisons. If all eight remap comparisons fail, then an interrupt can be asserted to CPU. In one aspect of the disclosure, a parallel comparison may be implemented to check that the CPU access address falls within the application code space of the flash (e.g., the remap source address). Otherwise, the operation of the particular block is bypassed.

Figure 5:
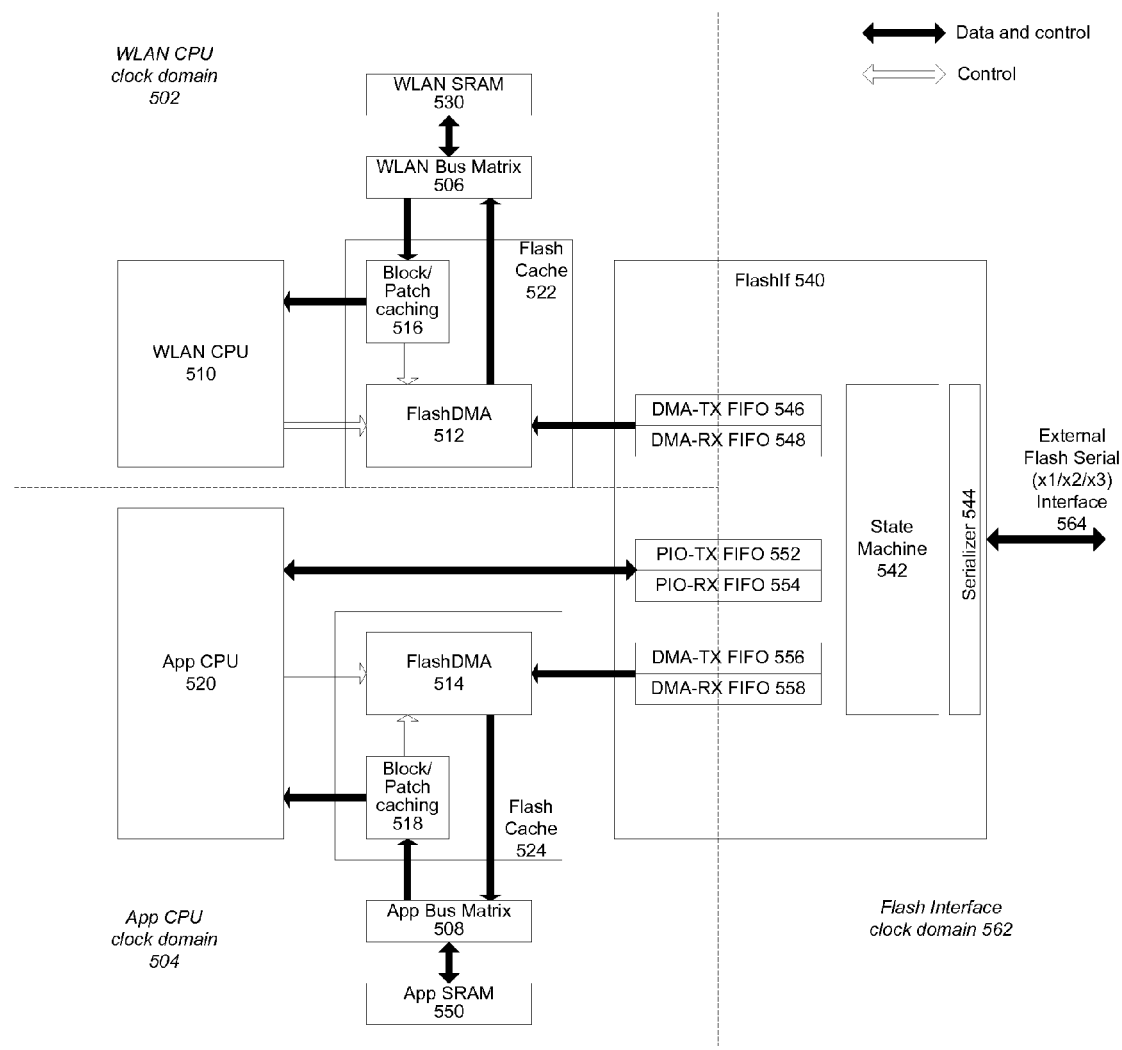
FIG. 5 illustrates a block diagram of a processor chip in accordance with one or more aspects of the present disclosure.

FIG. 5 illustrates a block diagram of the basic processor chip in accordance with one or more aspects of the present disclosure.

The following description illustrate the logical connectivity between the blocks of the processor chip.

External Flash Interface and DMA

Some processor chips have a dual CPU subsystem architecture. Each of the dual CPU subsystem architecture may run on independent clocks. Flash accesses from the two CPU subsystem architecture may be independent. For example, the dual CPU subsystem architecture may include a wireless local area network (WLAN) CPU 510 and an application (App) CPU 520. The App CPU 520 may be the system master and the code running on this CPU may be configured to initialize the overall processor chip and common interfaces. To provide a single access interface (e.g., external flash serial interface 564) to the external flash device 110 or 310, a flash access logic is divided into separate blocks including a first flash cache block 522 in the WLAN CPU domain and a second flash cache block 524 in the App CPU domain. FlashDMA blocks 512 and 514 of the first and second flash cache blocks 522 and 524, respectively, each handle read DMA requests.

There is a separate instantiation of the FlashDMA block in each CPU domain with each running on their corresponding CPU bus clock. For example, corresponding CPU clock for the WLAN CPU 510 operating in a WLAN CPU clock domain 502, while the CPU clock for the App CPU 520 operating in the App CPU clock domain 504. An instantiation of the FlashDMA block corresponds to an initial instance of the FlashDMA block. A common FlashIF block 540 interfaces the FlashDMA blocks, 512 and 514, to the external flash device 110 or 310. The FlashIF block 540 runs on the flash interface clock operating in a flash interface clock domain 562. A serial flash interface clock is derived from the flash interface clock. The interface to the Flash-DMA block in each CPU domain is through asynchronous command and data first in first out (FIFO) devices such as DMA-TX FIFOs 546 and 556, and DMA-RX FIFOs 548 and 558.

In one aspect of the disclosure, the APP CPU 520 can initiate direct access to the flash device by providing byte level data directly to the FlashIF through another set of FIFO devices, e.g., PIO-TX FIFO 552, and PIO-RX FIFO 554. WLAN CPU 510 access to the flash device is through read DMA implementation, which is implemented through the DMA-TX FIFOs 546 and 556, and DMA-RX FIFOs 548 and 558. Any write implementation to the flash device 110 or 310 from the WLAN CPU 510 is implemented through the App CPU 520. In addition, operational parameters of access to and/or from the DMA are set by the APP CPU 520 at system startup. The FlashDMA blocks 512 and 514 and FlashIf block 540 are described below.

FlashDMA

The FlashDMA block 512 or 514 manages data transfer from the external flash device 110 or 330 to the internal SRAM (e.g., WLAN SRAM 530 or App SRAM 550). This FlashDMA block 512 or 514 is implemented as part of the flashcache blocks 522 or 524, respectively. The remap source register 434 and/or the remap destination register 436 may also be defined as part of the flashcache block 522 or 524. There are two sources that can initiate DMA requests, the flashcache block, e.g., flashcache block(s) 522 and/or 524, or the CPU, e.g., App CPU 520 and/or WLAN CPU 510. The primary function of the FlashDMA block(s) 512 and/or 514 is to provide arbitration between the requests from the two sources. This results in only one clock domain crossing between each CPU domain and the Flash interface clock domain for DMA operation. In this aspect, the Flash-DMA interface to the SRAM is kept separate from the SRAM interface of the FlashCache. This allows concurrent execution of code from the SRAM through FlashCache mapping and DMA from the flash device 110 or 310. In some aspects, the FlashDMA block handles only logical DMA transfers and is not aware of the type of flash device or command structure.

DMA Request from FlashCache

The flashcache block 522 or 524 initiates a DMA when a miss is detected for patching, e.g., hardware managed patching. In one aspect, the flash address, the SRAM address and transfer lengths are set up first and then a request signal is asserted. Transfer length is specified in terms of bytes. The flash address is configured as a 32-bit word. When the DMA starts, the FlashDMA asserts an acknowledgement. The flashcache removes the request signal when the acknowledgement is received. When the DMA completes, Flash-DMA asserts a completed signal. The flashcache waits for the completed signal before asserting a new request. The completed signal is cleared when a new request is received.

DMA Request from CPU

Another source of the DMA request is the CPU (e.g., APP CPU 520 and/or WLAN CPU 510). In this aspect, the flash address, SRAM address, and transfer length as registers may be setup by a software algorithm. The flash address may be configured as a 32-bit word. The transfer length may be specified in bytes. In one aspect, a write to the transfer length register represents an internal DMA request. An arbiter (not shown) inside the FlashDMA arbitrates between the internal DMA request and the flashcache request. The arbitration process is active when there is no active transfer going on. A DMA request may not be interrupted after the DMA request is acknowledged and started. Status bits indicate the pending, active or completed status to the CPU. The completed status bit can also assert an interrupt to the CPU, if interrupt is enabled.

DMA Request Processing

When the DMA request is granted, the FlashDMA enters an active state. In the active state, the FlashDMA interfaces with the FlashIF block through the two FIFOs, the DMA-Tx FIFO 546 or 556 and the DMA-Rx FIFO 548 or 558. To initiate a DMA, the transfer length and the start address of the flash device 110 or 310 are written to the DMA-Tx FIFO 546 or 556 of the FlashIf 540. The FlashIf 540 uses the LSB bytes of the address word as configured. The FlashIF 540 fetches external data (e.g., application code or ROM patch code) from the flash device 110 or 310 and stores them in the DMA-Rx FIFO 548 or 558. The FlashDMA engine checks for the FIFO status and transfers the fetched data from the FIFO to the system SRAM. When the requisite number of bytes of the fetched data is transferred, the operation is complete.

The FIFOs are 32-bit wide to facilitate efficient data transfer on the system busses. The FlashIf block concatenates bytes received from the external flash device 110 or 310 and writes to the DMA-Rx FIFO 548 or 558, for example. If the transfer length is not a multiple of 4 bytes, the last word is zero padded.

System SRAM Interface

The SRAM interface is a master interface (e.g., advanced high-performance bus (AHB) master interface) that connects or couples to a bus matrix 506 or 508. The AHB is a bus standard for connecting components, such as SRAM, CPU or the like, on a processor. Although writing to the SRAM is accomplished in 32-bit words, the last word may be written in a different bit word configuration. The DMA start address in the internal SRAM space may be restricted to word boundaries. In some aspects, the transfer length in bytes may be in multiples other than four. The SRAM interface allows byte-wise access to the SRAM to write the last partial word. A FlashDMA unit is instantiated in each CPU domain and connects to the corresponding bus Matrix, FlashCache and CPU.

In an aspect of the present disclosure, two or more CPU units may be arranged within a device such that each CPU has flash cache memory available and a mapping scheme for each CPU to a common external flash memory.

FlashIf Interface

The FlashIF provides two independent DMA interfaces for the two FlashDMA blocks 512 and 514. The FlashIF block 540 allows the two FlashDMA blocks 512 and 514 to run with clocks asynchronous to each other and the Flash Interface.

Process Flow

Figure 6:
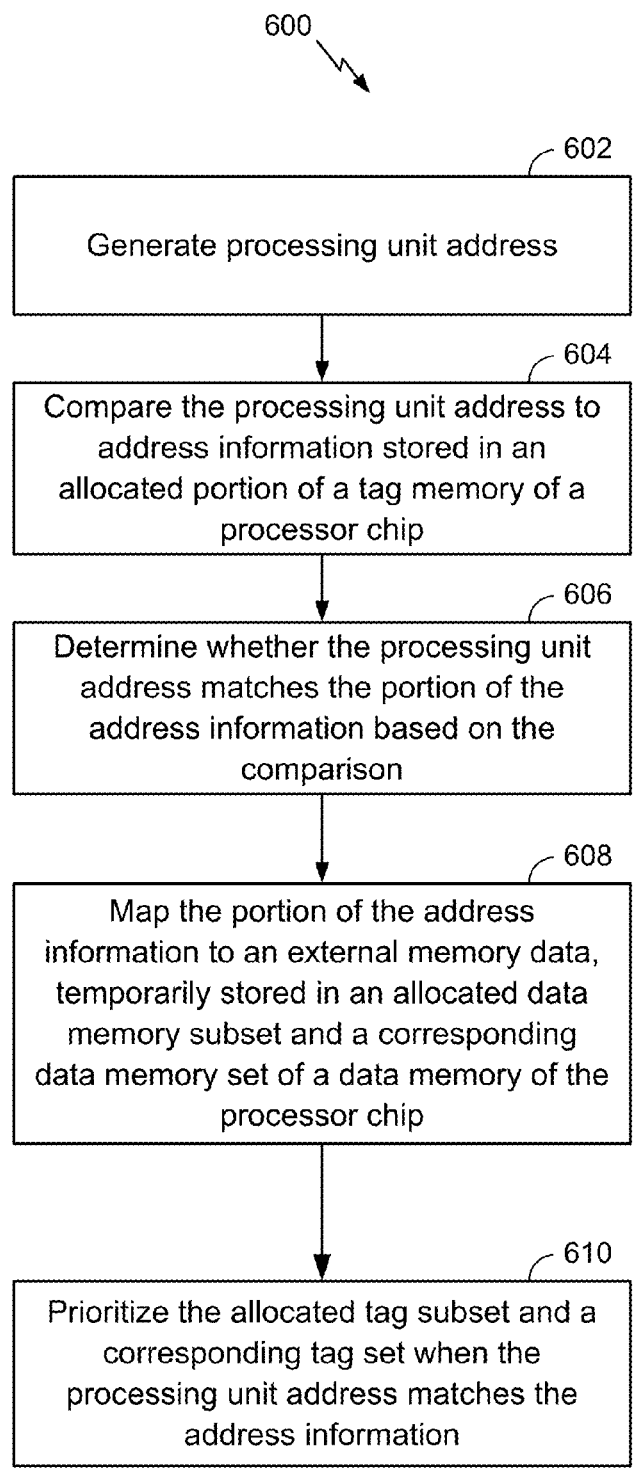
FIG. 6 illustrates a method for memory tagging in accordance with one or more aspects of the disclosure.

FIG. 6 illustrates a method for memory tagging in accordance with one or more aspects of the disclosure.

In block 602, a processor chip receives a processing unit address. In block 604, the processing unit address is compared to at least a portion of an address information stored in an allocated tag subset of a tag memory of the processor chip. In block 606, it is determined whether the processing unit address matches the portion of the address information based on the comparison. In block 608, the portion of the address information is mapped to an external memory data, which is temporarily stored in an allocated data memory subset and a corresponding data memory set of a data memory of the processor chip. In block 610, the allocated tag subset and a corresponding tag set are prioritized when the processing unit address matches the portion of the address information.

CONCLUSION AND ALTERNATE ASPECTS OF THE DISCLOSURE

Although specific circuitry has been set forth, it will be appreciated by those skilled in the art that not all of the disclosed circuitry is required to practice the disclosed embodiments. Moreover, certain well known circuits have not been described, to maintain focus on the disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein, the term "memory" refers to any type of long term, short term, volatile, nonvolatile, or other memory and is not to be limited to any particular type of memory or number of memories, or type of media upon which memory is stored.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium.

The machine or computer readable medium that stores the software code defining the methodologies and functions described herein includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium, instructions and/or data may be provided as signals on transmission media included in a communication apparatus.

For example, a communication apparatus may include a transceiver having signals indicative of instructions and data. The instructions and data are configured to cause one or more processors to implement the functions outlined in the claims.

The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

The description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, in which reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The foregoing description of one or more embodiments or aspects of the present disclosure has been presented for the purposes of illustration and description. It is not intended to be exhaustive or to limit the disclosure or the invention to the precise form disclosed. Many modifications and variations are possible in light of the above teaching. Although the present disclosure and invention has been described in connection with certain embodiments, it is to be understood that modifications and variations may be utilized without departing from the principles and scope of the disclosure or invention, as those skilled in the art will readily understand. Accordingly, such modifications would be practiced within the scope of the disclosure and invention, and within the scope of the following claims or within the full range of equivalents of the claims.

Further, the attached claims are presented merely as one aspect of the present invention. No disclaimer is intended, expressed, or implied for any claim scope of the present invention through the inclusion of this or any other claim language that is presented herein or may be presented in the future. Any disclaimers, expressed or implied, made during prosecution of the present application regarding the claims presented, changes made to the claims for clarification, or other changes made during prosecution, are hereby expressly disclaimed for at least the reason of recapturing any potential disclaimed claim scope affected by presentation of specific claim language during prosecution of this and any related applications. Applicant reserves the right to file broader claims, narrower claims, or claims of different scope or subject matter, in one or more continuation or divisional applications in accordance within the full breadth of the present disclosure, and the full range of doctrine of equivalents of the present disclosure, as recited in this specification.

What is claimed is:

1. A cache system, comprising:
   a processor chip receiving a processing unit address;
   a comparing device comparing the processing unit address to at least a portion of an address information stored in an allocated tag subset of a tag memory of the processor chip to determine whether the processing unit address matches the portion of the address information,
   a mapping device mapping the portion of the address information of an external memory data, temporarily stored in an allocated data memory subset and a corresponding data memory set of a data memory of the processor chip;
   a stacking loop searched in groups of allocated tags, in which each tag in each group of allocated tags is ordered in the stacking loop based at least in part on a most recently used tag in the group of allocated tags when the processing unit address matches the portion of the address information; and
   a data memory address generator generating a data memory address corresponding to an allocated location in the data memory temporarily storing the external memory data when the processing unit address matches the portion of the address information, the tag memory updating at least the portion of the address information and a data memory address corresponding to the allocated data memory subset and the corresponding data memory set when new external memory data is fetched from an external memory.

2. The cache system of claim 1, in which the mapping device maps the allocated tag subset and a corresponding tag set to the allocated data memory subset and the corresponding data memory set according to a one to one mapping relationship.

3. The cache system of claim 2, in which the mapping device maps the allocated tag subset and the corresponding tag set to an allocated portion of an external memory that stores at least a portion of the external memory data according to a dynamic mapping relationship.

4. The cache system of claim 2, in which the allocated data memory subset and the corresponding data memory set, the allocated data memory subset and the corresponding data memory set as well as the allocated tag subset and the corresponding tag set, each comprise a fixed block size.

5. The cache system of claim 1, in which the portion of the address information corresponds to a read only memory patch code address information and in which the external memory data corresponds to a read only memory patch code.

6. The cache system of claim 1, in which the external memory subset, the data memory subset and the tag subset comprise a cache line.

7. The cache system of claim 6, in which an allocated portion of the data memory for storing the external memory data comprises eight data memory sets, each data memory set divided into eight cache lines.

8. The cache system of claim 6, in which an allocated portion of the tag memory for storing the portion of the address information comprises eight tag memory sets, each tag memory set divided into eight cache lines.

9. A method comprising:
receiving a processing unit address;
comparing the processing unit address to at least a portion of an address information stored in an allocated tag subset of a tag memory of a processor chip;
determining whether the processing unit address matches the portion of the address information based on the comparison;
mapping the portion of the address information of an external memory data, temporarily stored in an allocated data memory subset and a corresponding data memory set of a data memory of the processor chip;
prioritizing the allocated tag subset and a corresponding tag set when the processing unit address matches the portion of the address information; and
updating at least the portion of the address information and a data memory address corresponding to the allocated data memory subset and the corresponding data memory set when new external memory data is fetched from an external memory.

10. The method of claim 9, further comprising mapping the allocated tag subset and the corresponding tag set to an allocated portion of an external memory that stores at least a portion of the external memory data according to a dynamic mapping relationship.

11. The method of claim 9, further comprising mapping the allocated tag subset and the corresponding tag set to the allocated data memory subset and the corresponding data memory set according to a one to one mapping relationship.

12. A cache system, comprising:
a processor chip that receives a processing unit address;
a mask register of the processor chip that masks at least a portion of the processing unit address to vary a block size of an allocated portion in an external memory that stores an external data to be processed in the processor chip as well as to vary a block size of an allocated portion in a data memory of the processor chip that temporarily stores at least a portion of the external data;
a comparing device that compares the masked processing unit address to a masked source register address to determine whether the masked processing unit address matches the masked source register address;
a remap destination register in the processor chip that remaps a masked destination register address to the allocated portion, in a data memory, subject to the varied block size when the masked processing unit address matches the masked source register address.

13. The cache system of claim 12, further comprising a remap source register in the processor chip that remaps the masked source register address to the allocated portion, in the external memory, subject to the varied block size when the masked processing unit address matches the masked source register address.

14. The cache system of claim 13, in which the mask register masks at least one least significant bit of the source register address and/or the processing unit address.

15. The cache system of claim 13, in which the remap source register further remaps the masked source register address to the allocated portion in the external memory subject to the varied block size according to a dynamic mapping relationship.

16. The cache system of claim 12, further comprising a stacking loop searched in groups of allocated tags, in which each tag in each group of allocated tags is ordered in the stacking loop based at least in part on a most recently used tag when the processing unit address matches a portion of an address information.

17. The cache system of claim 16, in which the remap destination register is controlled by at least a first processor and the stacking loop is controlled by at least a second processor.

* * * * *